(12) United States Patent
Abreo

(10) Patent No.: US 9,684,978 B2
(45) Date of Patent: Jun. 20, 2017

(54) CAMERA, COMPUTER PROGRAM AND METHOD FOR MEASURING THERMAL RADIATION AND THERMAL RATES OF CHANGE

(71) Applicant: Progress Rail Services Corporation, Albertville, AL (US)

(72) Inventor: Gabriel G. Abreo, Kansas City, MO (US)

(73) Assignee: Progress Rail Services Corporation, Albertville, AL (US)

(*) Notice: Subject to any disclaimer, the term of this patent is extended or adjusted under 35 U.S.C. 154(b) by 0 days.

(21) Appl. No.: 15/186,851

(22) Filed: Jun. 20, 2016

(65) Prior Publication Data

US 2016/0300364 A1 Oct. 13, 2016

Related U.S. Application Data

(63) Continuation of application No. 14/677,192, filed on Apr. 2, 2015, now Pat. No. 9,372,120, which is a continuation of application No. 13/594,341, filed on Aug. 24, 2012, now Pat. No. 9,000,371.

(60) Provisional application No. 61/527,724, filed on Aug. 26, 2011.

(51) Int. Cl.
| | |
|---|---|
| *G02F 1/01* | (2006.01) |
| *G06T 11/00* | (2006.01) |
| *G01J 5/02* | (2006.01) |
| *G01J 5/04* | (2006.01) |
| *G01J 5/20* | (2006.01) |
| *G01J 5/62* | (2006.01) |
| *H04N 5/33* | (2006.01) |
| *G06T 7/11* | (2017.01) |
| *G01J 5/00* | (2006.01) |
| *G01J 5/06* | (2006.01) |

(52) U.S. Cl.
CPC .......... *G06T 11/001* (2013.01); *G01J 5/0025* (2013.01); *G01J 5/025* (2013.01); *G01J 5/026* (2013.01); *G01J 5/04* (2013.01); *G01J 5/20* (2013.01); *G01J 5/62* (2013.01); *G06T 7/11* (2017.01); *H04N 5/33* (2013.01); *G01J 2005/0077* (2013.01); *G01J 2005/0085* (2013.01); *G01J 2005/067* (2013.01); *G01J 2005/202* (2013.01)

(58) Field of Classification Search
CPC .................. G01J 2005/0085; G01F 23/246
See application file for complete search history.

(56) References Cited

U.S. PATENT DOCUMENTS

| | | | | | |
|---|---|---|---|---|---|
| 5,059,796 | A | * | 10/1991 | Nakamura | G08B 13/194 250/330 |
| 5,937,077 | A | * | 8/1999 | Chan | G06K 9/00711 250/339.15 |
| 2011/0021944 | A1 | * | 1/2011 | Arnon | A61B 5/015 600/549 |

(Continued)

*Primary Examiner* — Kiho Kim
(74) *Attorney, Agent, or Firm* — Bookoff McAndrews, PLLC

(57) ABSTRACT

A camera, computer program, and method for determining and displaying temperature rates of change for regions within the camera's field of view. More specifically, the embodiments provide for the continuous, real-time temperature measurement and display of a plurality of objects within the camera's field of view, and further for the real-time processing and display of the temperature rates of change for the region.

17 Claims, 14 Drawing Sheets

(56) References Cited

U.S. PATENT DOCUMENTS

2011/0205367 A1* 8/2011 Brown .................... H04N 5/33
348/164

* cited by examiner

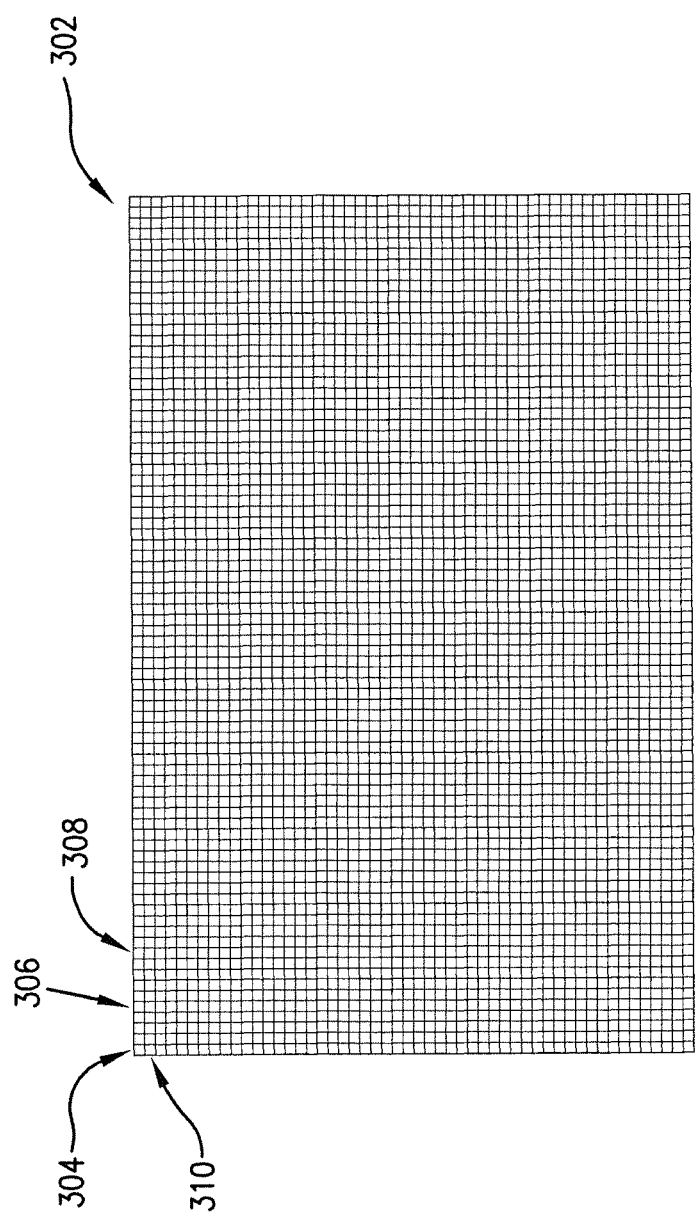

CAMERA, COMPUTER PROGRAM AND METHOD FOR MEASURING THERMAL RADIATION AND THERMAL RATES OF CHANGE

RELATED APPLICATIONS

This non-provisional patent application is a continuation application and claims priority benefit, with regard to all common subject matter, of commonly assigned U.S. patent application Ser. No. 14/677,192, filed Apr. 2, 2015, and entitled "CAMERA, COMPUTER PROGRAM AND METHOD FOR MEASURING THERMAL RADIATION AND THERMAL RATES OF CHANGE," which is now U.S. Pat. No. 9,372,120, issued Jun. 21, 2016 ("the '120 patent"). The '120 patent is a continuation application and claims priority benefit, with regard to all common subject matter, of commonly assigned U.S. patent application Ser. No. 13/594,341, filed Aug. 24, 2012, and entitled "CAMERA, COMPUTER PROGRAM AND METHOD FOR MEASURING THERMAL RADIATION AND THERMAL RATES OF CHANGE," which is now U.S. Pat. No. 9,000,371, issued Apr. 7, 2015 ("the '371 patent"). The '371 patent is a non-provisional application that claims priority benefit, with regard to all common subject matter, of earlier-filed U.S. Provisional Patent Application No. 61/527,724, filed Aug. 26, 2011, and entitled "THERMAL CURRENT DETECTION APPARATUS AND METHOD." The identified earlier-filed patents and provisional patent application are hereby incorporated by reference in their entirety into the present application.

BACKGROUND

1. Field

Embodiments of the present invention are directed to the technical field of imaging cameras and image processing. More particularly, the embodiments are directed to a thermal and infrared imaging camera, computer program, and method for displaying visual representations of thermal scenes and for determining and displaying temperature rates of change for objects within the scenes.

2. Related Art

Thermal imaging systems, such as thermal cameras, are often employed in temperature and/or heat measurement applications. Objects with a temperature above absolute zero emit heat in the form of thermal radiation. The intensity of the emitted radiation increases as the temperature of the objects increase. Thus, the temperature of objects can be determined by measuring the intensity of the radiation the objects emit. Typical thermal cameras measure thermal radiation by sensing radiation in the infrared range. The cameras convert the intensity of the sensed infrared radiation (IR) into electrical signals. The electrical signals are, thus, representative of the IR intensity emitted from objects within the camera's field of view. The signals can then be processed and converted to a two-dimensional visual representation of the IR intensity of the scene. Such a representation facilitates the creation of a coherent visible picture.

Standard thermal imaging cameras may provide a user with feedback such as maximum and minimum scene temperatures. The cameras may also convert the sensed IR into a visual display, while providing color palette gradients representative of all temperatures within a given scene. These cameras work well for static temperature readings in which the user wishes to see the temperature maximums and minimums out of a span of temperatures within a given spatial area or scene. Applications for such cameras generally involve diagnostic analysis in which a maximum static temperature or distribution of temperatures is needed. A typical application is found in the home inspection market, wherein thermal imaging cameras may be used to locate heat losses, insulation anomalies, leaks, or other structural issues.

However, standard thermal imaging cameras often have at least some inaccuracies in the detected IR and displayed visual representation, which is due to reflected energy and the differing emissivities for objects within the camera's field of view. In addition, in some applications it is desirable to obtain more information regarding the particular objects being imaged, such as a time and/or a spatial rate of change of emitted IR and temperatures for the objects.

SUMMARY

Embodiments provide for a camera, computer program, and method for determining temperature rates of change for objects within the camera's field of view. More specifically, the embodiments provide for the continuous, real-time temperature measurement and display of a plurality of objects within the camera's field of view, and further for the real-time processing and display of the temperature rates of change for said objects.

Embodiments of the present invention include a thermal imaging camera comprising a camera housing; an optical assembly that directs IR radiation into the camera housing; an IR sensor positioned within the housing that includes a plurality of sensing elements that senses IR radiation; a memory element positioned within the housing and operable to stores digital information; a processing element positioned within the housing and operable to manipulate the digital information; an electronic display for displaying visual images and/or videos; and a user interface for receiving a user's input and transmitting the input to the camera. The camera senses IR radiation emitted from objects within the camera's field of view and further to converts the sensed radiation into a visual representation of the radiation. In embodiments, the sensor's plurality of sensing elements emits electrical signals based on the intensity of IR radiation incident upon the plurality of sensing elements. The camera's processing element then converts the electrical signals into a two-dimensional visual representation of the IR radiation, which may be displayed for viewing by the camera's user. As every sensing element of the sensor may correspond to a pixel of the display device, the display device may display a visual representation of the IR radiation within the camera's field of view. The camera continually senses the IR radiation at a given frequency rate, herein referred to as a "frame rate." The IR captured for each frame rate may be hereinafter referred to as a "thermal scene." Because the camera senses and displays the thermal scene on a near-continuous basis, the visual display may be in the form of a video display. In further embodiments, the processing element may manipulate the electrical signals emitted from the sensor to provide increased accuracy and precision of the visual representations of the thermal scene. In addition, the processing element may manipulate the electrical signals to provide other useful information to the user, such as the temperature of each object within the thermal scene, or the minimum, maximum, and average temperatures of the scene. In even further embodiments, the processing element may also determine and provide temperature rates of change of objects within the camera's field of view. Such temperature rates of change may either be time based rates of change or spatial based rates of change. It is understood that memory and processing elements are controlled and directed by the computer program of the present invention.

Additional embodiments of the present invention include methods for measuring the temperature rates of change for objects within the camera's field of view. An exemplary method includes the initial step of obtaining temperature data from objects within the camera's field of view. Because the camera may function as a nearly-continuous real-time video camera, the camera obtains temperature measurements for each thermal scene. Next, areas of interest within the scene are detected and saved in the memory element. For subsequent scenes, additional sets of temperature data from objects within the field of view are obtained. Areas of interest within the subsequent scenes may also be detected and saved. After data has been obtained from at least two scenes, the method includes the step of attempting to match the areas of interest from the most recent scene with those obtained from a previous scene. If an area of interest is matched, then the difference between the temperatures of the matched areas of interest is calculated to determine a temperature rate of change. Because the camera operates to generate visual representations of the temperature data on a nearly-continuous real-time video basis, the areas of interest may be referenced against each other, while in a plurality of orientations, such that even matching areas of interest that change orientations or positions from scene to scene may be recognized and the temperature differences may be calculated.

Additional embodiments of the present invention may provide for areas of interest within the camera's field of view to be detected and tracked. In such an embodiment, the camera may be attached to one or more servo-motors that operate to rotate the camera about one or more rotational axes. As areas of interest are detected, the locations of the area of interest may be calculated, and the camera operates to command the servo-motors to direct the camera in such a position that the area of interest is positioned within the center of the camera's field of view. As the area of interest moves, the displacement is calculated and the servo-motors are again commanded to direct the camera into a centering position. Even further embodiments may include the determination of likely positions for the area of interest to be in the future. Such capabilities permit the servo-motors to prepare to direct the camera before the areas of interest have actually changed positions.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3 is a schematic of the camera's IR sensor and the plurality of sensing elements;

DETAILED DESCRIPTION

Figure 2:
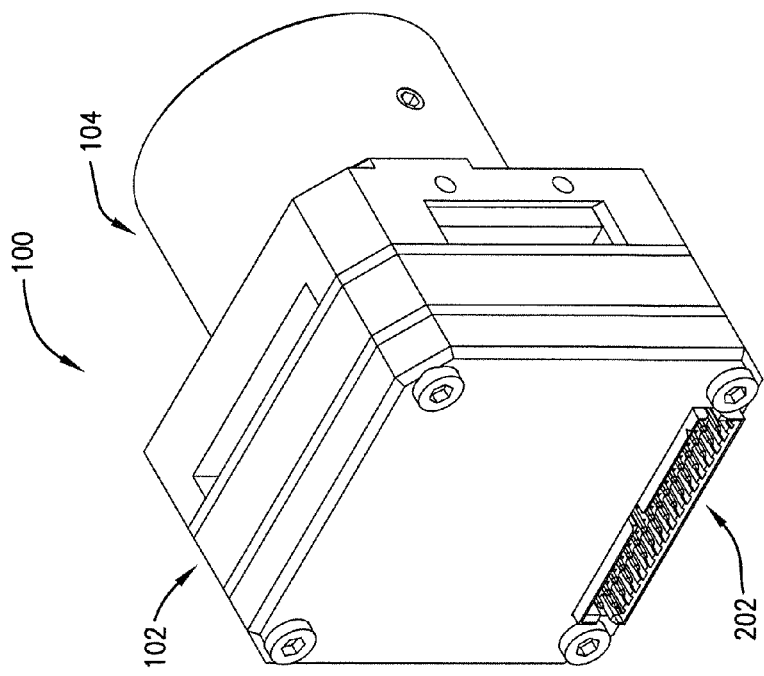
FIG. 2 is a rear perspective view of the thermal imaging camera of FIG. 1.
Figure 1:
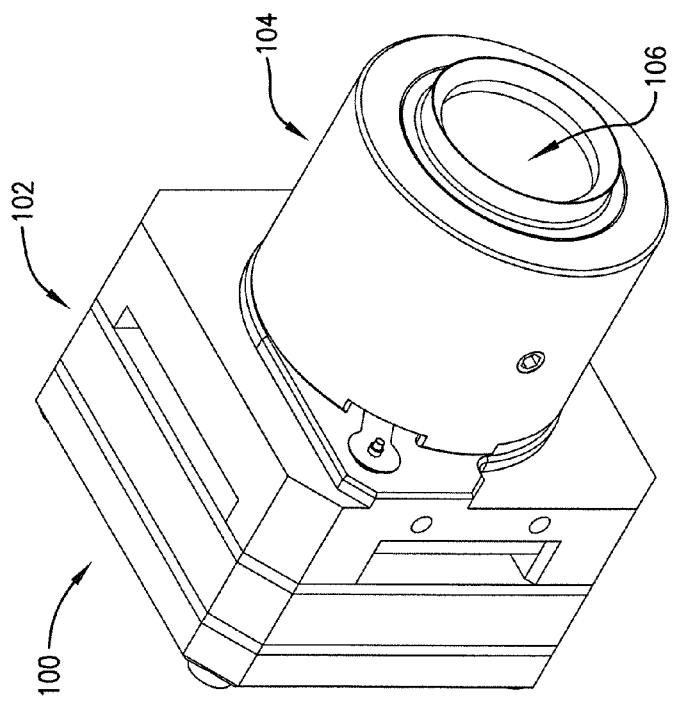
FIG. 1 is a front perspective view of the thermal imaging camera of embodiments of the present invention.

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also, not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Hardware

Embodiments of the present invention are directed to a thermal imaging camera 100 comprising a generally rectangular housing 102; an optical assembly 104 attached to a front face of the housing that focuses and directs IR radiation into the housing; an IR sensor module located within the housing that senses intensities of IR radiation and that further converts the radiation into electrical signals; a memory element located within the housing that saves and records data, computer programs, or other information; one or more processing elements located within the housing that performs data manipulations on the data; an electronic display that presents visual representations of the data and the data manipulations; and a user interface for customizing the operation of the camera. Embodiments thus provide for the user of the present invention to sense IR radiation emitted from objects within the camera's field of view and further to convert the sensed radiation into a visual representation of the thermal scene. In addition, the camera may obtain and display information indicative of the temperature rate of change of said objects within the thermal scene.

The housing 102 includes a generally rectangular base. The base may be made from aluminum, acetal delrin, and/or combinations of similar materials that provide the base with high stiffness, low friction, and dimensional stability. In certain embodiments, the housing may contain the IR sensor, memory element, and processing element, each of which is described in more detail below. The housing may also contain other standard circuitry components that may be required for operation of the camera, such as printed circuit boards, integrated circuits, transistors, capacitors, inductors, or the like. A rear face of the housing may contain an electrical connector assembly 202 that operates to connect the camera to external display devices, power sources, and servo-motors. The connector assembly 202 may generally provide communication between the camera's processing element and one or more external components. The connector assembly 202 may include parallel ports, serial ports, USB ports, IEEE 1394 high-speed serial bus ports, combinations thereof, and the like. The connector assembly 202 may connect to the external components through a wire or cable, optical fiber, or wirelessly. An exemplary connector assembly may include a plurality of USB ports. The connector assembly may also couple to a network, such as the Internet, and may be able to communicate electronically, through wires or cables, optically, through optical fibers, wirelessly, using radio frequency (RF) protocols, such as IEEE 802.11 standards, combinations thereof, and the like. The connector assembly may additionally function to permit the camera to download computer programs or applications to be executed by the processing element, as well as to upload data that is stored in the memory element.

The optical assembly 104 includes a generally cylindrical frame and an aperture formed through its longitudinal axis, wherein one or more focusing lenses 106 may be positioned. The optical assembly 104 may also include a shutter assembly (not shown), which functions to open and close the aperture, thereby allowing radiation to enter the camera. The optical assembly 104 may be made from aluminum or other suitable material that provides sufficient stiffness and dimensional stability. The focusing lens 106 may be made from any material suitable for IR optical functions; however, in certain embodiments, the lens may be crafted from germanium. Because germanium is transparent to radiation in the IR spectrum, it may be preferred for use in thermal applications. In addition, germanium has a high index of refraction, such that it may be useful for wide-angle lens applications.

The IR sensor module is located within the base module and includes one or more IR sensors 302. In certain embodiments, the IR sensor module may include a focal plane array (FPA), thermopile, micro-cantilever, or bolometer. In additional embodiments, the sensor may be in the form of an uncooled microbolometer, which includes a plurality of sensing elements arranged in a two-dimensional pixel array. Embodiments of the present invention provide for the array to be of any size. However in certain embodiments the array may be 160 pixels by 120 pixels, 320 pixels by 240 pixels, or 640 pixels by 480 pixels. Each sensing element (i.e. 304, 306, 308, 310) detects the intensity of IR radiation incident upon it. Each sensing element includes a bottom layer of silicon substrate with electrical contacts deposited thereon. The sensing element also includes a top layer of IR absorbing material, such as amorphous silicon or vanadium oxide, which is spaced above the bottom layer. Ends of the IR absorbing material are electrically connected to the electrical contacts deposited on the bottom layer. Because the IR absorbing material is spaced above the bottom layer, it is thermally isolated from the other components of the camera. As IR radiation is absorbed by the IR absorbing material, the material's electrical conductance measurably changes, with such changes being directly proportional to the intensity of the IR radiation absorbed. Because, then, the intensity of IR radiation is proportional to the temperature of the object emitting the radiation, the conductance change may be correlated with the temperature of the object that emitted the radiation.

The memory element may include a computer-readable medium that may include any device that can contain or store computer codes, programs, data, or applications for use by or in connection with the processing element, discussed in more detail below. Examples of the computer-readable medium may include random-access memory (RAM), such as static RAM (SRAM) or dynamic RAM (DRAM), cache memory, read-only memory (ROM), flash memory, hard-disk drives, compact disc ROM (CDROM), digital video disc (DVD), or Blu-Ray™, combinations thereof, and the like. The memory element generally stores data to be utilized by the camera, such as the measured IR radiation data. The stored data may also include computer codes, programs, applications, system settings, user preferences, measured data, combinations thereof, and the like. In addition, the memory element may be configured to communicate with the processing element.

The processing element generally executes computer code, programs, or applications and may include devices such as processors, microprocessors, microcontrollers, field programmable gate arrays (FPGAs), combinations thereof, and the like. The processing element may further include clocks or timers. An exemplary processing element may include the Blackfin® BF561 or BF608 processor from Analog Devices. In even further embodiments, the processing element may include two or more processors, such that each processor is responsible for carrying-out separate processes simultaneously. For instance, one processor may focus on rendering images, while the other is focused on performing data manipulation. The processing element may utilize a computer operating system, such as Windows® from Microsoft®, Inc. of Redmond, Wash. or Linux open source operating system. The processing element may be programmed using programming languages such as C#, .NET, and Flash programming. Thus, users of embodiments of the present invention may customize the performance of the present invention based on user preferences. For example, the user may selectively adjust measurement parameters, such as field of view size, frame rate, temperature display, and color palettes.

The computer program of embodiments of the present invention that directs and controls the processing and memory elements may run directly on the camera of embodiments of the present invention. Alternatively, the computer program may run on an external computing device, wherein the computer program directs the processing element and memory element located inside the camera via an electrical connection connected via the connector assembly. In additional embodiments, the connection may be wireless. In even further embodiments, the processing and memory elements may each be located on an external computing device. In such an embodiment, the computer program may direct the operation of the external processing and memory elements, such that that the camera functions to capture the thermal image data and to pass the data along to the external processing and memory elements. In certain other embodiments, the computer program may simultaneously run on the camera and one or more external computing devices. Thus, a first portion of the computer program, code segments, or executable files may execute on the camera, while a second portion of the program, code segments, or executable files may execute on the computing device.

The electronic display generally presents visual information, such as a visual representation of the thermal scene and any associated graphics, text, or combinations thereof to the user. The display may be configured to communicate with the processing element. The display may include any monitor or video device that utilizes technologies such as cathode ray tube (CRT), plasma, liquid crystal display (LCD), light-emitting diode (LED), LED-LCD, combinations thereof, and the like. The display may present any screen shape and aspect ratio. In various embodiments, the display may also include touchscreen capability, such that the user may touch the screen to enter data, respond to prompts, display menus or additional screens, and the like. The display may be in the form of an electronic display that is embedded into an exterior side of the housing. However, in additional embodiments, the display may be separate from the housing and connected to the processor via electronic cable or wireless connections.

The user interface generally allows the user to enter data into the system. The user interface may be configured to communicate with the processing element and may include devices such as keyboards, keypads, mice, tablets, pushbuttons, switches, knobs, dials, combinations thereof, and the like. In some embodiments, the system may rely only on the display with touchscreen capability for user input. In other embodiments, the system may include the user interface in addition to, or instead of, the display with touchscreen capability.

Operation

Figure 4:
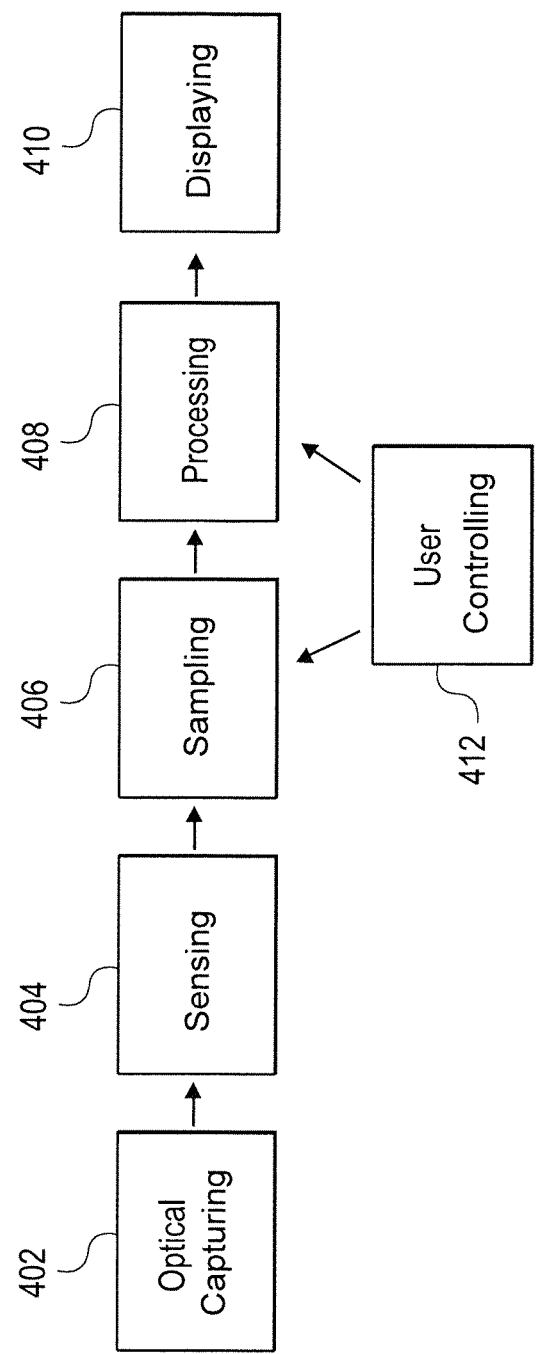
FIG. 4 is a flowchart of a method for capturing and displaying a thermal scene.

Embodiments of the present invention are directed to thermal and infrared imaging camera, computer program, and method that (1) display thermal scenes; (2) determine temperature rates of change between successive thermal scenes, and (3) determining temperature rates of change between regions within a single thermal scene. Embodiments may operate by way of a method illustrated in FIG. 4. To display the thermal scenes, embodiments of the present invention employ the use of the processing element, the memory element, and/or any other combination of components that are controlled or directed by the computer program or that are otherwise included in embodiments of the present invention.

The method of displaying the thermal scene includes Step 402 that directs, via the optical assembly, IR radiation into the camera and onto the sensor; in Step 404, the sensor receives the IR radiation incident upon the sensing elements via the optical assembly; in Step 406, the sensor is sampled to determine an intensity of IR radiation incident upon the sensor and information obtained during the sampling is converted into digital electrical data; in Step 408, the processing element processes the electrical data to generate visual representations of the temperature and to determine other temperature based information; and in Step, 410 the display presents the visual representations and other temperature based information for viewing by a user. In addition, the process may include Step 412, by which the user may manipulate the functions of Step 406 and Step 408, such that the user can adjust camera, computer program, and method settings to function according to the user's specifications.

By way of the Step 402, the lens of camera's optical assembly focuses radiation emitted from an object within the camera's field of view and directs the radiation onto a single point, or sensing element, within the IR sensor. Thus, when considering the field of view as a whole, the optical assembly focuses the entire thermal scene of the camera's field of view onto the sensor's plurality of sensing elements. The IR radiation incident upon the sensor's sensing elements is a representation of all the IR radiation being emitted from objects that are 1) within the camera's field of view, and 2) emitting IR radiation directed at the camera. Upon absorbing IR radiation, the conductance of the sensing elements changes in relation to the intensity of IR radiation being absorbed. In response, each sensing element emits an electrical signal that is indicative of the conductance change experienced by the sensing elements. Thus, a visual representation, or an image, of the emitted IR radiation can be created by sampling the electrical signals emitted from each sensing element of the sensor and converting the electrical signals into visual representations of the IR radiation.

Once the optical assembly has directed the IR radiation into the camera, and onto the sensor, the electrical signals from the sensing elements are sampled via the Step 406. Embodiments of the present invention provide for the sensing elements to be sampled at the frequency of the frame rate. The electrical signals generated by the sensing elements are converted from an analog format to digital data before being processed via the Step 408. Additionally, Step 406 may operate by way of a combination of hardware and computer program code segments that provide level translation and data formatting, such that the digital data is in format that may be properly processed via Step 408. The sensing element sampling may be performed in any order or along any direction in the two-dimensional array of sensing elements, such that a two-dimensional visual representation can be created. However, in certain embodiments the sensing elements are sampled in a sequential format such that subsequent sensing element sampling will be accurate representations of real-time thermal scenes within the camera's field of view. For instance, as illustrated in FIG. 3, the sampling of sensor 302 may start with sensing elements 304 and proceed from left to right. Such sampling would subsequently encounter sensing elements 306, 308, and each of the sensing elements in between. The sampling would continue advancing to the right until the last sensing elements in the row has been sampled. Thereafter, the sampling begins on the second row of sensor 302, starting with sensing elements 310 and continuing across the second row. The sampling continues in such a manner until each sensing element in the sensor 302 has been sampled. Embodiments of the present invention thus provide for the continuous sensing and converting of the electrical signals into digital data, such that visual representations of the thermal scene within the camera's field of view can be continuously displayed in real-time.

Figure 5:
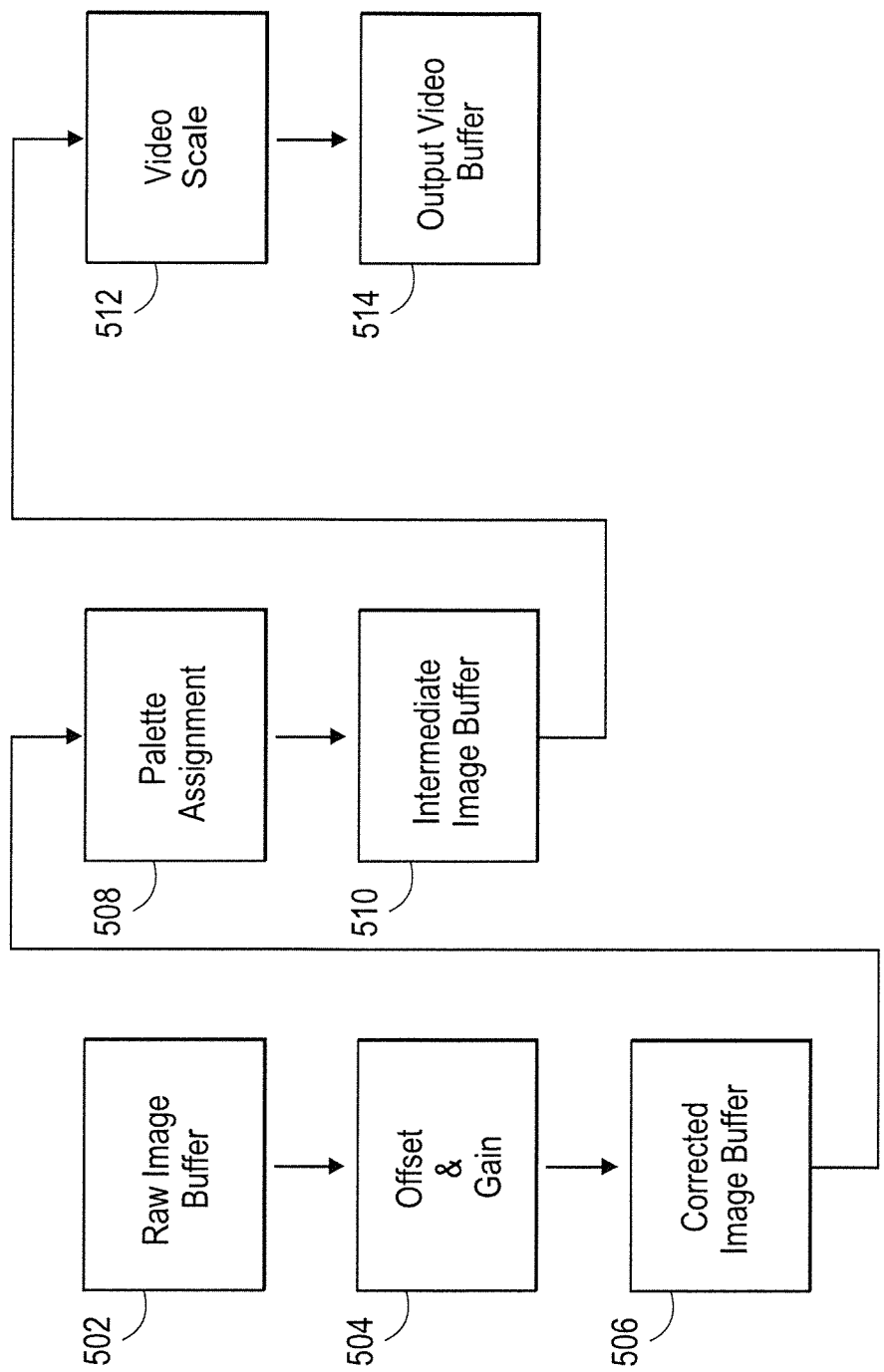
FIG. 5 is a flowchart of a method for processing captured IR data and preparing the data for display.

In Step 408, the processing element is responsible for manipulating the data received during Step 406 and for converting the digital data into high quality image and video representation of the thermal scene. Step 408 may further comprise a method as illustrated in FIG. 5, which includes Step 502 that receives and stores the data from Step 406; a Step 504 that corrects the data for internal thermal measurement errors; a Step 506 that stores the data that was corrected in Step 504; a Step 508 that assigns visual color representations to the data; a Step 510 that stores the color assigned data from the Step 508; a Step 512 that prepares the data for display; and a Step 514 that stores the data before being displayed. In addition, Step 408 may include one or more temperature rate of change methods, described in more detail below, which may manipulate the data to determine temperature rates of change for objects, regions, or areas of interest within the camera's field of view. The method steps illustrated by FIG. 5 may be implemented by the processing element, the memory element, or a combination of elements that are controlled or directed by the computer program of embodiments of the present invention.

In embodiments of the present invention, the data obtained from sampling the electrical signals of the sensing elements, via Step 406, may be saved in the memory element, via Step 502, before being processed or further manipulated. The data is saved in the memory element for each frame cycle, such that data corresponding to each thermal scene obtained by the camera is saved.

Step 408 may further include processes that improve and/or increase the accuracy and precision of the data obtained from the sensing elements. For instance, Step 504 may determine the required offset and gain signal adjustments required to precisely correlate temperatures with the signals obtained from the sensing elements. Some of the offset and gain adjustments may be due to internal characteristics and physical structures of the sensing elements. However, additional offset and gain adjustments may be required to correct for temperature variations that occur during normal use of the camera. In embodiments of the present invention in which the sensor is a microbolometer, because the IR absorbing material is thermally isolated from the rest of the sensing element, the sensor is generally thermally stable. However, there may still be a window of stabilization that must be maintained via a loop control. As an example, if the sensor is to be temperature stabilized at 30 degrees Celsius with a tolerance of +/−0.25 degrees Celsius, then the loop control within the camera will adjust its output to maintain the specified operating temperature parameters. In using these parameters, if the camera's noise-equivalent temperature at the sensor is 50 mK, then the processor may incorrectly detect a difference of 0.5 degrees Celsius when there may be no change in the IR radiation emitted from objects within the thermal scene. Thus, embodiments of the present invention provide for a lock-out or guard band function that prevents Step 504 from triggering on a sensed temperature drift, when such drift is within the noise-equivalent temperature. The tighter the loop control mechanism, the more sensitive and accurate the processor becomes.

In embodiments of the present invention where a non-temperature stabilized sensor is used, a two-point correction method, as is commonly known in the art, may be applied to the data before it is passed through and saved in the memory element via Step 506. The two-point correction method accounts for the temperature drift experienced during non-temperature stabilized operation. Such two-point correction method may incorporate the use of the camera's shutter assembly to determine a baseline sample reading from the sensor. When the shutter is closed, each sensing element in the sensor will be sensing the IR radiation emitted from the shutter. Because the shutter has a uniform temperature and emits a uniform thermal scene, the processing element can determine the expected baseline output from each sensing element, and by comparing the expected readings to the baseline readings, the appropriate offset and gain values for each sensing element may be determined. Thereafter, via Step 504, the data may be manipulated by incorporating the required offsets or gain adjustments. Upon the data being corrected via Step 504, the error corrected data is stored in the memory element via Step 506.

Figure 6:
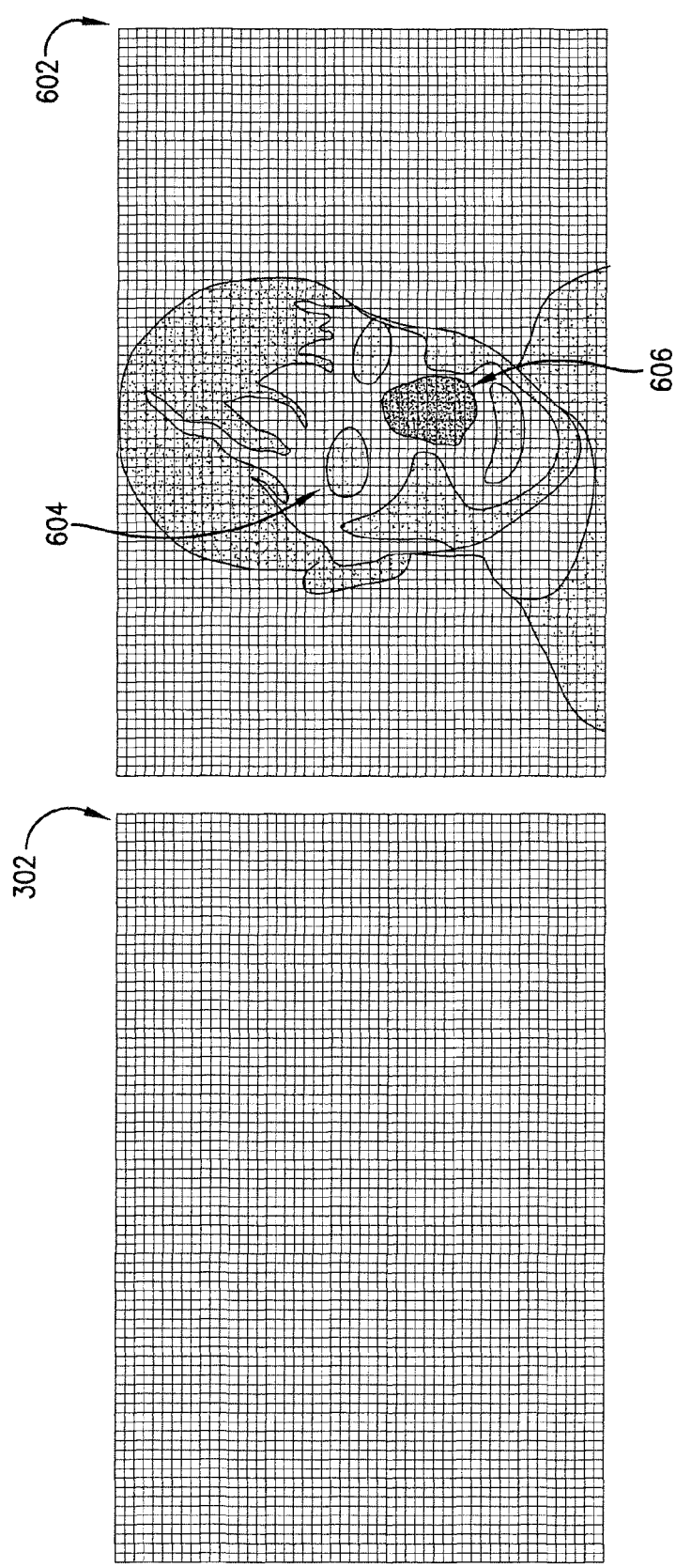
FIG. 6 is a schematic illustration of the sensing element locations of a sensor and a corresponding visual representation of a thermal scene captured by the sensor.

By way of Step 508, the data stored in the memory element, via the Step 506, is further manipulated by assigning visual color values for each data value that originates from a sensing element's electrical signal. In certain embodiments, the assigned color values include only grayscale colors; however, in additional embodiments the full visual color spectrum may be used. Because the electrical signal received from each sensing element corresponds to the intensity of IR radiation sensed by the sensing element, and because the intensity of IR radiation corresponds to a temperature value, the color assigned to the data values that originated from the sensing elements likewise corresponds to the temperature value. Thus, via Step 508, visual colors for each sensing element are assigned, and a visual representation of the thermal scene can be created. For instance, sensing elements that indicate high temperature data value may be assigned a lighter grayscale color such as light grey or white. Whereas, sensing elements that return lower temperature data value may be assigned a darker grayscale color such as dark grey or black. However, the choice of color scheme is arbitrary, and embodiments of the present invention contemplate the use of any color within the visual spectrum. As a non-limiting example, FIG. 6 illustrates a visual representation 602 of the IR intensity emitted by a human face as captured by the sensor 302. In the visual representation 602, the areas around the face's eyes 604 are displayed in white or light grey, thus representing higher temperature values. Whereas, the area around the face's nose 606 is displayed in dark grey or black, representing lower temperature values. Step 508 may additionally extract certain key pieces of supplemental information, such as the minimum, maximum, and average scene temperature values. Such supplemental information may be displayed simultaneously with the visual representation of the thermal scene.

In addition to the color assignment, Step 508 may optimize the contrast values of the data by using a histogram equalization function. In such an embodiment, the histogram equalization function may sample each data value that originates from the sensor's sensing elements for a given scene and determines a transformation function that linearizes the data values across all possible data values. Thus, Step 508 spreads out the most frequent data values, such that when the data values are assigned visual colors, the areas of lower contrast may be given a higher contrast value, effectively increasing the clarity of the image.

Upon the data being assigned palette colors, the palette assigned data is stored in the memory element, via Step 510. Thereafter, the data is scaled to conform to standard image and video output parameters via Step 512. Step 512 is responsible for converting the data to display standards that can be displayed via the electronic display. Such display standards may include, for instance, quarter-QVGA, QVGA, or VGA. In addition, Step 512 may be responsible for exporting the data to specified video formats, such as NTSC or PAL. Once the data has been converted to the appropriate image or video display standard and format, the video data is stored in the memory element, via the Step 514 until such time that it is displayed via the display in Step 410. Step 512 may also add the supplemental information (i.e. minimum, maximum, average scene temperature values) into the video data, such that the supplemental information can be displayed simultaneously with the visual representations. Step 410 provides a visual output of the process image data received and manipulated by each step within the Step 408.

Additional embodiments of the present invention may provide for Step 412, which includes a plurality of input controls that permits the user customize the operation of the camera. Such input controls may include, for instance, the ability changes the contrast and brightness levels of the display or to change the supplemental data that is displayed. The user may select the various inputs using the features embodiments of the present invention.

Temperature Rates of Change

The Operations section described above details a camera's method for converting static or non-static IR based thermal scenes into a visually displayable image or video. Embodiments of the present invention further provide for methods to measure and display temperature rates of change for objects within thermal scenes. In certain embodiments, the present invention provides for a camera, computer program, and method that measure and display time based temperature rates of change for objects, regions, or areas of interest within the camera's field of view. In additional embodiments, the present invention provides a camera, method, and computer program to measure and display spatial based temperature rates of change. Beginning with time based temperature rates of change; embodiments of the present invention permit such temperature rates of change to be determined for both static and non-static thermal scenes. Static scenes are defined as those scenes obtained by a stationary camera with respect to stationary objects within the camera's field of view.

Figure 7:
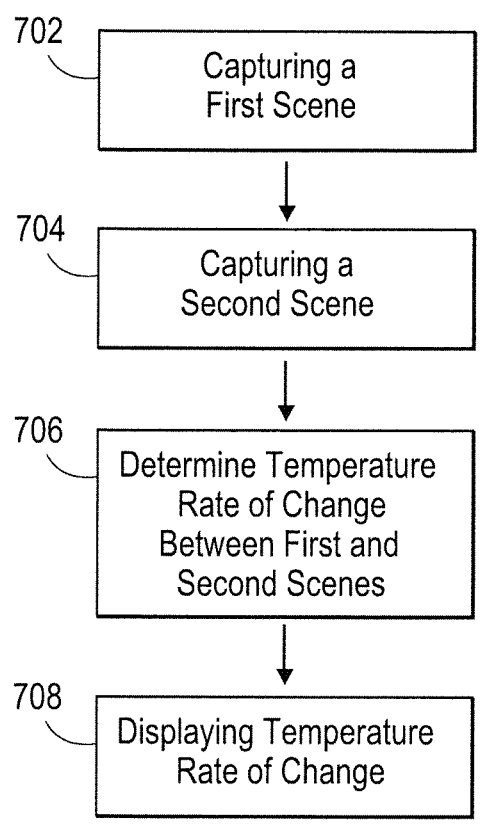
FIG. 7 is a flowchart of a method for determining and displaying temperature rates of change between scenes.

As detailed below, for static scenes, the computer program of embodiments of the present invention includes a plurality of codes segments executable by the processing element and memory element for performing the steps of the method of the present invention. The steps of the method may be performed in the order shown in FIG. 7, or they may be performed in a different order. Furthermore, some steps may be performed concurrently as opposed to sequentially. Also, some steps may be optional.

The method includes the first step of capturing a first thermal image scene with the thermal camera, Step 702. Via embodiments of the present invention, the temperature of each sensing element corresponding to the initial thermal scene is calculated and stored in the memory element. Thereafter, a second thermal scene is captured with the thermal camera, Step 704. Via embodiments of the present invention, the temperature of each sensing element corresponding to the second thermal scene is calculated and stored in the memory element. At Step 706, embodiments of the present invention compare the temperatures obtained from the sensing elements from the first and second thermal scenes and determine a temperature rate of change for each of the sensing elements between thermal scenes. The temperature rate of change is determined based on a time period over which the thermal scenes were captured. Finally, at Step 708, the temperature rate of change is displayed on the electronic display of the present invention.

Figure 8:
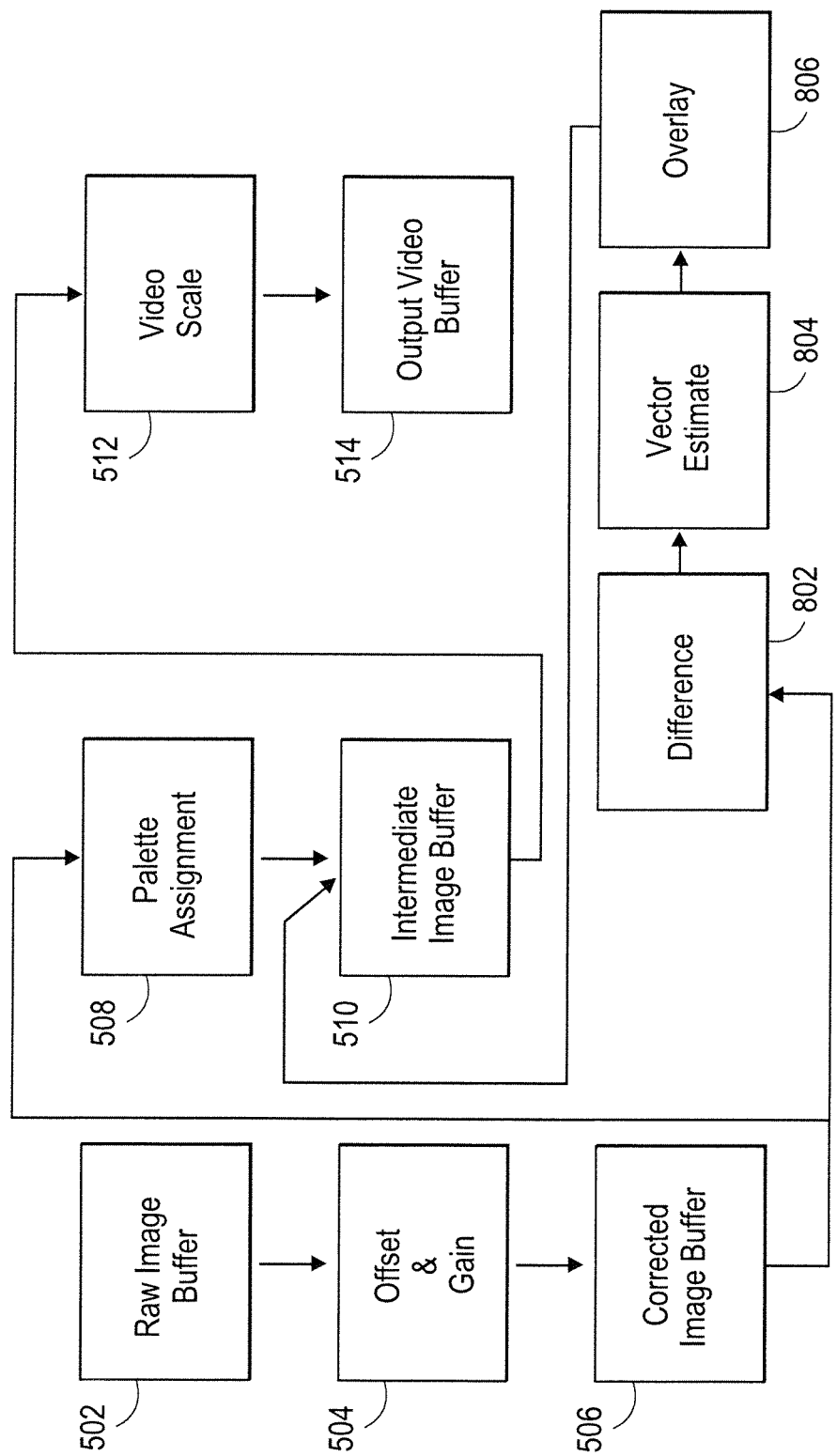
FIG. 8 is a flowchart of a method for implementing the method of FIG. 7.

Steps for implementing the above-stated static scene temperature rate of change method are illustrated in FIG. 8 and include Step 802 that is responsible for determining temperature rates of change for successive scenes that are stored in the memory element, via Step 506; in Step 804, the temperature rate of change determinations are refined and further calculations may be made to increased the accuracy of the determinations; and in Step 806, the temperature rate of change is further manipulated to generate a visual representation, which may then be overlaid onto the visual representation of the thermal scene stored in the memory element via Step 510. The steps illustrated by FIG. 8 may be implemented by the processing element, the memory element, or a combination of elements that are controlled or directed by the computer program of embodiments of the present invention.

By way of Step 802, the corrected data saved in the memory element, via the Step 506, is retrieved, and the temperature values originating from each sensing element for each thermal scene is determined. Upon a determination of temperature value for successive scenes, Step 802 further is responsible for determining the differences between temperature values for a given sensing element between successive scenes. Because all of the sensing elements in the sensor are employed to obtain temperature values for a given scene, Step 802 may determine the differences between temperature values for all sensing elements in the sensor. The result of the temperature difference determination for a given sensing element is a time-based, temperature rate of change for the sensing element. Once the rate of change determination has been made, the rate of change values corresponding to each sensing element are stored in the memory element.

In additional embodiments of the present invention, the temperature rate of change may only be determined for a specified region of the thermal scene. In such an embodiment, groups of sensing elements comprising a subset of all of the sensor elements within the sensor are configured to receive IR radiation from the regions. The user of the invention may select, via Step 412, regions in which to determine the temperature rate of change between successive scenes. In further embodiments, the processing element, via Step 408 may automatically select regions in which to determine temperature rates of change. In such an embodiment, the regions may be selected based upon the regions of having high temperature values, or the regions may correlate to the group of sensing elements having indications of unique patterns or temperature profiles.

Step 802 may also include a temporal noise filter that operates to remove unwanted noise that may be introduced to each sensing element between successive scenes. The temporal noise filter operates by comparing the data from sequential sensing elements and estimating which sensing elements were expected to change and which ones were not. Using the expectations, embodiment of the present invention can predict those changes that are the result of unwanted noise. As a result of the temperature calculations and the noise filters, the magnitude of the change in temperature between scenes can be represented by a graphical method. Upon determining the temperature differences, such rate of change values may be saved in the memory.

By way of Step 804, the rates of change that are saved in the memory element are further manipulated by remapping the temperature rate of change vales to determine an even distribution across all vales. Such process is functionally similar to the histogram equalization process that was described above. Step 804 is responsible for sampling each rate of change value for each sensing element and determining a transformation function that linearizes the rate of change values across all possible values. Thus, Step 804 spreads out the most frequent rate of change values, such that of lower vale may be given a higher value, effectively increasing the clarity of the rate of change values.

Upon determining the rate of change values, Step 806 is responsible for associating representative colors with each rate of change value and applying the colors as an overlay to the thermal image data that is saved at the Step 510. The representation for the rate of change values may include shades, or a range, of colors included in a gradient color palette. As an example, positive temperature rates of change (i.e. those associated with heating) may be represented by the color red with smaller magnitude rates of change may be identified using shades of pink. Conversely, negative temperature rates of change (i.e. those associated with cooling) may be represented by the color blue with smaller magnitude rates of change identified using shades of light blue. In certain embodiments, as in FIG. 8, the colors may be overlaid onto the thermal image data from Step 510. For example, the colors may be displayed simultaneously with the display of the thermal scene, such as being displayed simultaneously with visual representation 602. Scenes without any change may remain the original grayscale colors assigned by Step 508. In other embodiments, the colors representing the temperature rate of change may be used exclusively as the visual representation of the scene. Because, temperature rate of change values, and corresponding colors, are determined for each sensing element in the sensor, the resulting color representation is itself a visual representation of the temperature rate of change of a scene. In such an embodiment, Step 508 would not be employed, and Step 806 would provide the temperature rate of change data to the memory element, via Step 510. Thereafter, the display of the present invention would display the visual representation of the temperature rate of change. In embodiments where only temperature rates of change for regions of the sensor are being determined, Step 806 may similarly overlay the rate of change representation onto the thermal image data or the thermal change representation may be exclusively displayed.

Figure 9:
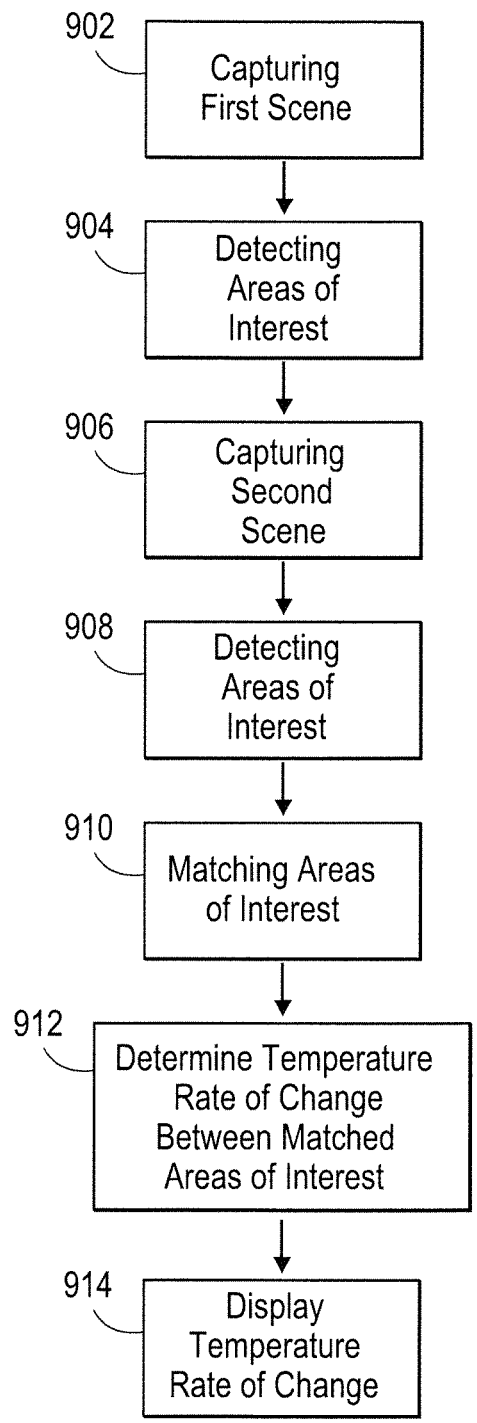
FIG. 9 is a flowchart of a method for determining and displaying temperature rates of change for objects within a camera's field of view.

For non-static scenes, a temperature rate of change method, as illustrated in FIG. 9, may be employed. The method includes the first step of capturing a first thermal image scene with the thermal camera, Step 902. Via embodiments of the present invention, the temperature of objects within the initial thermal scene are calculated and stored in the memory element. At Step 904, areas of interest within the first thermal scene are detected, wherein the areas of interest correspond to patterns representative of the arrangement of one or more of the objects within the thermal scene. The patterns and corresponding data are thus stored within the memory element. Thereafter, a second thermal scene is captured with the thermal camera, Step 906. Via embodiments of the present invention, the temperature of objects within the second thermal scene are calculated and stored in the memory element. The next step includes the detection of areas of interest within the second thermal scene and the storing of the pattern and corresponding data in the memory element, Step 908. At Step 910, embodiments of the present invention compare the areas of interest from the first and second thermal scenes to determine if any of the areas of interest match. If matching areas of interest are found, then embodiments provide for the determination of the temperature change between the areas of interest. Upon a temperature change determination, a temperature rate of change is calculated, Step 912, wherein the rate of change is determined based on a time period over which the first and second thermal scenes were captured. Finally, at Step 914, the temperature rate of change is displayed on the electronic display of the present invention.

Figure 10:
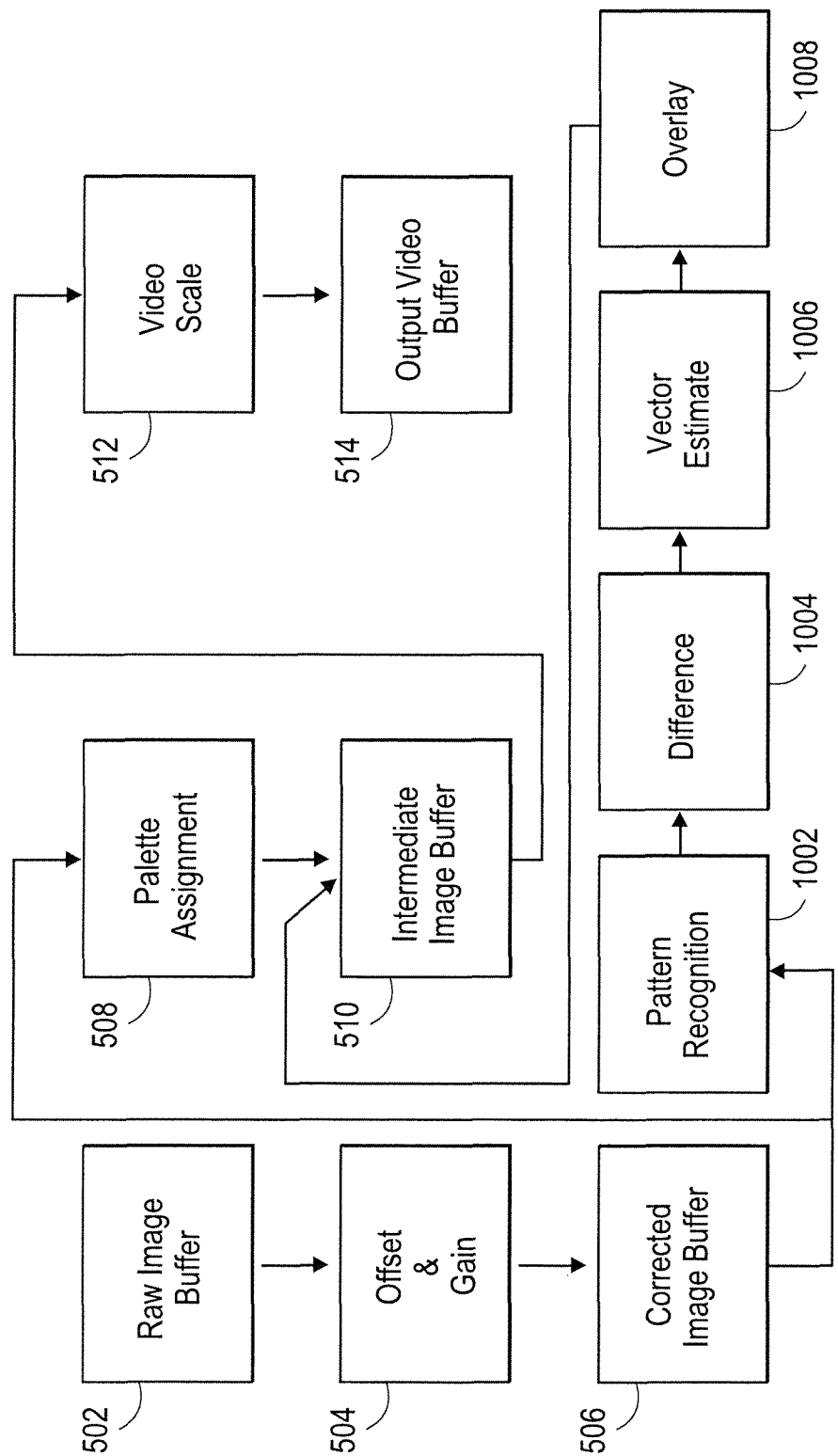
FIG. 10 is a flowchart of a method for implementing the method of FIG. 9.

Steps for implementing the above-stated temperature rate of change method are illustrated in FIG. 10 and include Step 1002 that is responsible for scanning the data received for each scene that is stored in the memory element, via Step 506, and detecting and matching areas of interest within the scene; in Step 1004, temperature rates of change that occur between matching areas of interest in successive thermal scenes are determined; in Step 1006, for the temperature rate of change calculations are refined and further calculations may be made to increased the accuracy of the calculations; and in Step 1008, the temperature rate of change is further manipulated to generate a visual representation, which may then be overlaid onto the visual representation of the thermal scene stored in the memory element via Step 510. The steps illustrated by FIG. 10 may be implemented by the processing element, the memory element, or a combination of elements that are controlled or directed by the computer program of embodiments of the present invention.

Figure 11:
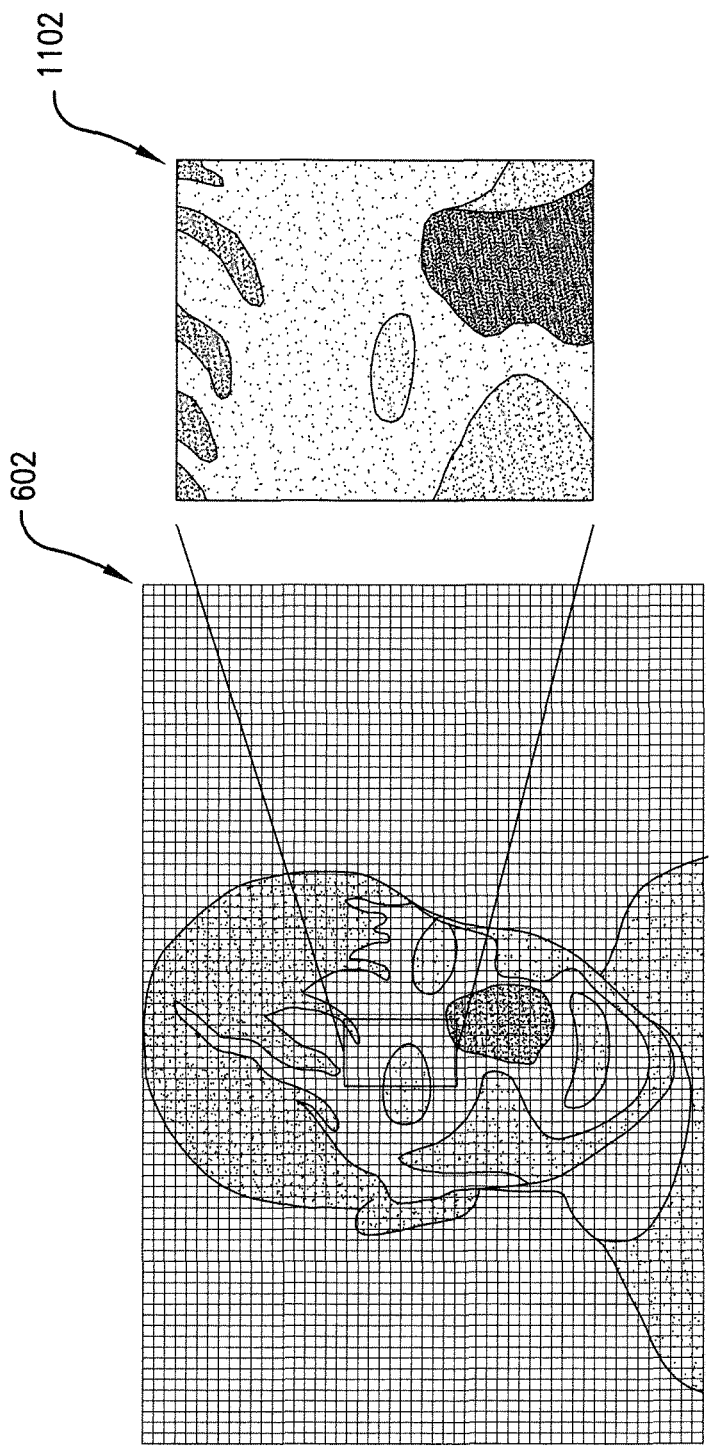
FIG. 11 is a schematic illustration of capturing an area of interest.

By way of Step 1002, the corrected data saved in the memory element, via the Step 506, is retrieved and scanned to locate areas of interest. Areas of interest include patterns of data that represent objects or group of objects within the camera's field of view. Areas of interest may include patterns that have an indication of high temperature values or patterns with indications of unique temperature profiles. For instance, as illustrated by FIG. 11, the pattern 602 representative of a human face may be scanned, and the areas around the face's right eye may be determined to be an area of interest 1102. The area of interest 1102 may have been selected because the pattern around the face's right eye has a high temperature value. The areas of interest, including the patterns and the corresponding data obtained from the sensing elements, are stored in memory for comparison with later scenes.

Via Step 1002, the data of the current scene is scanned to locate areas of interest. The scanning is performed periodically, with the timing of the scanning based on an interval timer. In certain embodiments, the interval timer may correspond to the frame cycle. Upon the expiration of the timer, the data from the current scene is scanned to detect areas of interest. If an area of interest is detected, embodiments of the present invention attempt to match the area of interest with all other areas of interest previously found and stored in the memory element. The attempts to match areas of interest are based on areas of interest having similar pattern shapes, similar temperature profiles, and/or similar velocity or acceleration profiles. If after scanning an entire scene a detected area of interest does not match an area of interest stored in memory element, then the unmatched detected area of interest and its corresponding temperature values are stored in the memory element for comparison with later scenes. If a matching area of interest is found, the temperature rate of change for the matched areas of interest is calculated via Step 1004, as described below. Embodiments of the present invention provide for multiple areas of interest to be stored in the memory for comparison and matching. Thus, embodiments of the present invention calculate the temperature rates of change for areas of interest that are in motion or that are in different spatial orientations between successive scenes.

Figure 12:
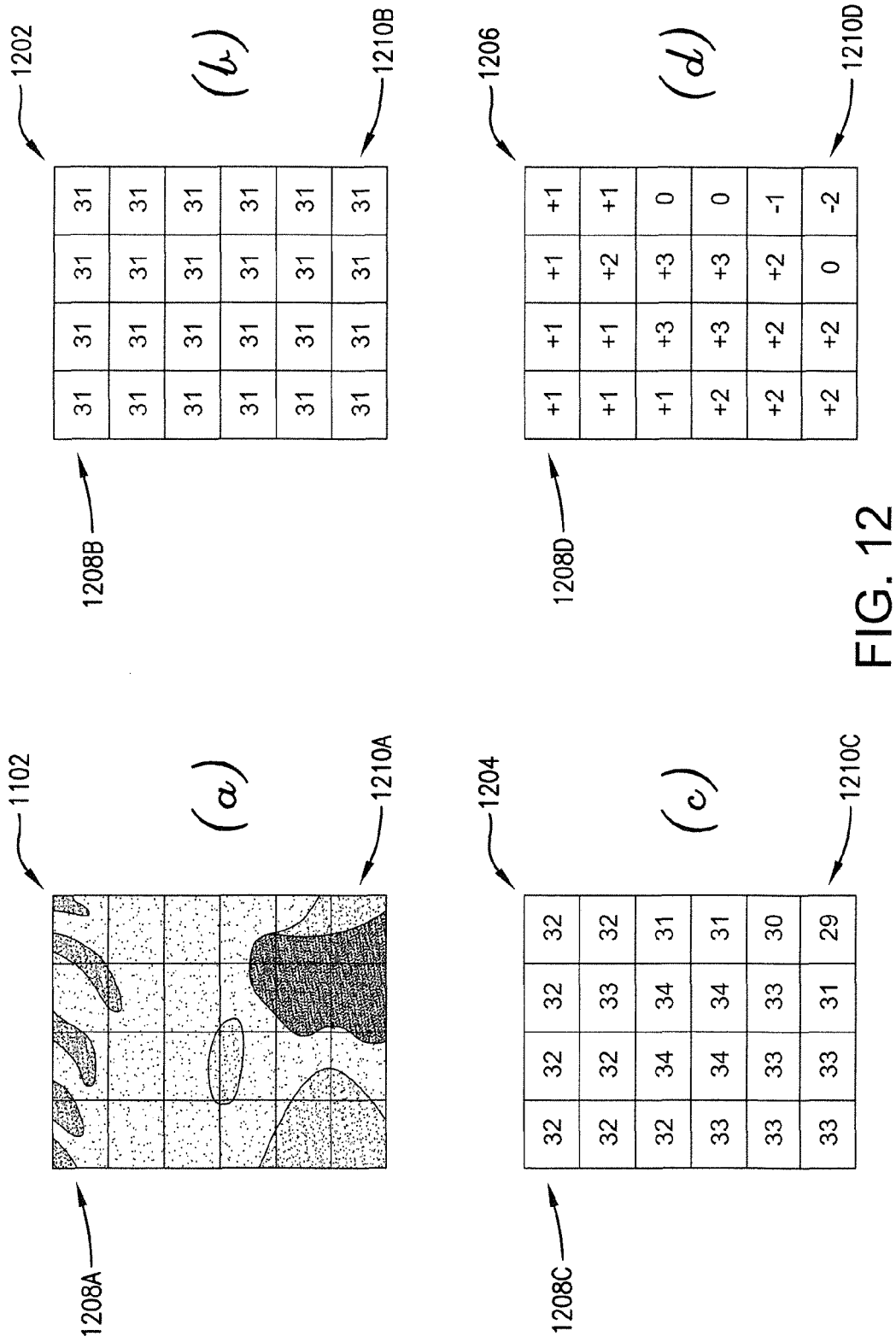
FIG. 12 is schematic illustration of determining a temperature rate of change for a given area of interest.

For each detected area of interest, Step 1004 is responsible for capturing the data and determining the temperature values originating from each sensing element corresponding to the detected area of interest. The detected area of interest may simply comprise data from a single sensing element; however, the area of interest may comprise data from a group of sensing elements. In certain embodiments, the step may determine the average temperature value for all of the sensing elements within the area of interest. By determining the average temperature value, spatial noise inherent within a thermal scene may be averaged out. Further, because each data value originating from a sensing element may correspond to a pixel of a visual representation of the thermal scene, individual data values may hereafter be referred to "pixels." As an example, area of interest 1102 of FIG. 12 illustrates an area of interest that is 4 pixels wide by 6 pixels high.

After successive scenes have been sampled, and if areas of interest have been matched, Step 1004 is responsible for determining the differences between the temperature values of matched areas of interest that were detected in successive scenes. For instance, as illustrated in FIG. 12, area of interest 1102 is comprised of temperature data values obtained from each sensing element that makes up area of interest 1102. The data contained within temperature value pattern 1202 represents the temperatures sensed by each sensing element during a first scene in which area of interest 1102 was detected. Next, the data contained within temperature value pattern 1204 represents the temperature sensed by each sensing element during a second scene in which area of interest 1102 was detected. After obtaining temperature values for area of interest 1102 in at least two scenes, Step 1004 is responsible for determining the difference between the temperatures sensed by each sensing element during the first and second scenes, and for storing the results in the memory element. In the current example, difference pattern 1206 represents the temperature rate of change between each of the sensing elements corresponding to the area of interest 1102 detected and matched during different scenes. Thus, the difference pattern 1206 represents the magnitude of the temperature rate of change, as experienced by the sensing elements comprising the area of interest 1102. Specifically, pixel 1208B of pattern 1202 indicates a temperature value of 31, which corresponds to a first temperature value from pixel 1208A of area of interest 1102. Next, and corresponding to a second scene, pixel 1208C indicates a temperature value of 32, which corresponds to a second temperature value from pixel 1208A of the area of interest 1102. Via Step 1004, the rate of change between pixel 1208C and pixel 1208B may be determined. It should be noted that for scenes in which the camera or area of interest are stationary, pixels 1208B and 1208C will likely correspond to the same sensing element. However, for non-static scenes, areas of interest may change spatial orientations, such that although the spatial pattern of the area of interest remains the same, the sensing element corresponding to a particular portion of the area of interest will likely change. Returning then to the present example, as illustrated by pixel 1008D of rate of change pattern 1206, the temperature rate of change experienced is +1, corresponding to an increase in temperature. Similarly all temperature rates of change displayed in rate of change pattern 1206 represent the rate at which each sensing element comprising area of interest 1102 changes in temperature over time.

Step 1004 may also include a temporal noise filter that operates to remove unwanted noise that may be introduced to each area of interest between successive scenes. The temporal noise filter operates by comparing the data from sequential areas of interest and estimating which sensing elements were expected to change and which ones were not. Using the expectations, embodiment of the present invention can predict those changes that are the result of unwanted noise. As a result of the temperature calculations and the noise filters, the magnitude of the change in temperature between successively captured regions of interest can be represented by a graphical method. Upon determining the temperature differences, such rate of change values are saved in the memory.

By way of Step 1006, the rates of change that are saved in the memory element are further manipulated by remapping the temperature rate of change vales to determine an even distribution across all vales. Such process is functionally similar to the histogram equalization process that was described earlier. Step 1006 is responsible for sampling each rate of change value for each area of interest and determines a transformation function that linearizes the rate of change values across all possible values. Thus, Step 1006 spreads out the most frequent rate of change values, such that the areas of lower vale are given a higher value, effectively increasing the clarity of the rate of change values.

Upon determining the rate of change values, Step 1008 is responsible for associating representative colors or graphics with each rate of change value and applies the graphics to the thermal image data that is saved at the Intermediate Image Step 510. The representation for the rate of change values may include graphics or a gradient color palette. As an example, positive temperature rates of change (i.e. those associated with heating) may be represented by the color red with smaller magnitude rates of change may be identified using shades of pink. Conversely, negative temperature rates of change (i.e. those associated with cooling) may be represented by the color blue with smaller magnitude rates of change identified using shades of light blue. For instance, as illustrated in FIG. 12, the rate of change indicated by pixel 1208D of the temperature rate of change pattern 1206 is +1, which indicates a positive rate of change. Thus, a light shade of pink may be overlaid onto the corresponding portion of the area of interest 1102 and displayed simultaneously with visual representation 602. Similarly, the rate of change indicated by element 1210D of rate of change pattern 1206 is −2, which indicates a negative rate of change. Thus, a light shade of blue may be overlaid onto the corresponding area of interest 1102 and displayed simultaneously with visual representation 602. Samples without any change may remain the original grayscale colors assigned by Step 508. In other embodiments, the colors representing the temperature rate of change may be used exclusively as the visual representation of the scene because, temperature rate of change values, and corresponding colors, are themselves a visual representation of the temperature rate of change of a scene. In such an embodiment, Step 508 would not be employed, and Step 1008 would provide the temperature rate of change data to the memory element, via Step 510. Thereafter, the display of the present invention would display the visual representation of the temperature rate of change.

Figure 13:
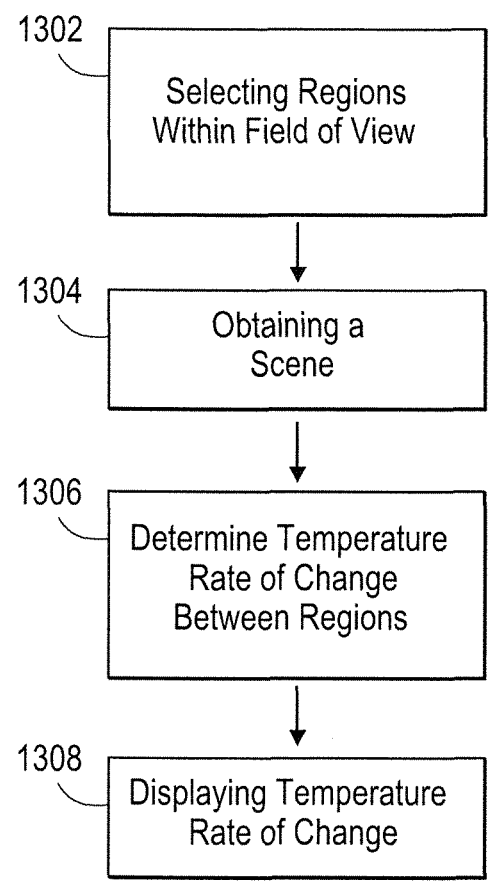
FIG. 13 is a flowchart of a method for determining and displaying spatial temperature rates of change between regions in a scene.

The above-described methods may be implemented when determining temperature rates of change over time. However, for temperature rates of change that may be occurring during a single moment in time, embodiments of the present invention provide for a camera, computer program, and method that determine and display spatial temperature rates of change. For instance, embodiments of the present invention may determine and display a magnitude and direction of temperature change within a single scene. Such magnitude and direction may be referred to as a heat flow. As detailed below, the computer program of embodiments of the present invention includes a plurality of codes segments executable by the processing element and memory element for performing the steps of the method of the present invention. The steps of the method may be performed in the order shown in FIG. 13, or they may be performed in a different order.

Furthermore, some steps may be performed concurrently as opposed to sequentially. Also, some steps may be optional.

The method includes the first step, Step 1302, of selecting two or more regions within the camera's field of view. Subsequently, via step 1304, a thermal image scene is obtained with the thermal camera. Embodiments of the present invention then provide for the temperature obtained from each sensing element that corresponds to each of the regions to be calculated and stored in the memory element. Thereafter, at Step 1306, embodiments of the present invention compare the temperatures obtained from the sensing elements corresponding to the two or more regions and determine a temperature rate of change between each of the regions. The temperature rate of change is determined based on a magnitude and a direction in which the temperature difference occurred. Finally, at Step 1308, the temperature rate of change is displayed on the electronic display of the present invention.

Figure 14:
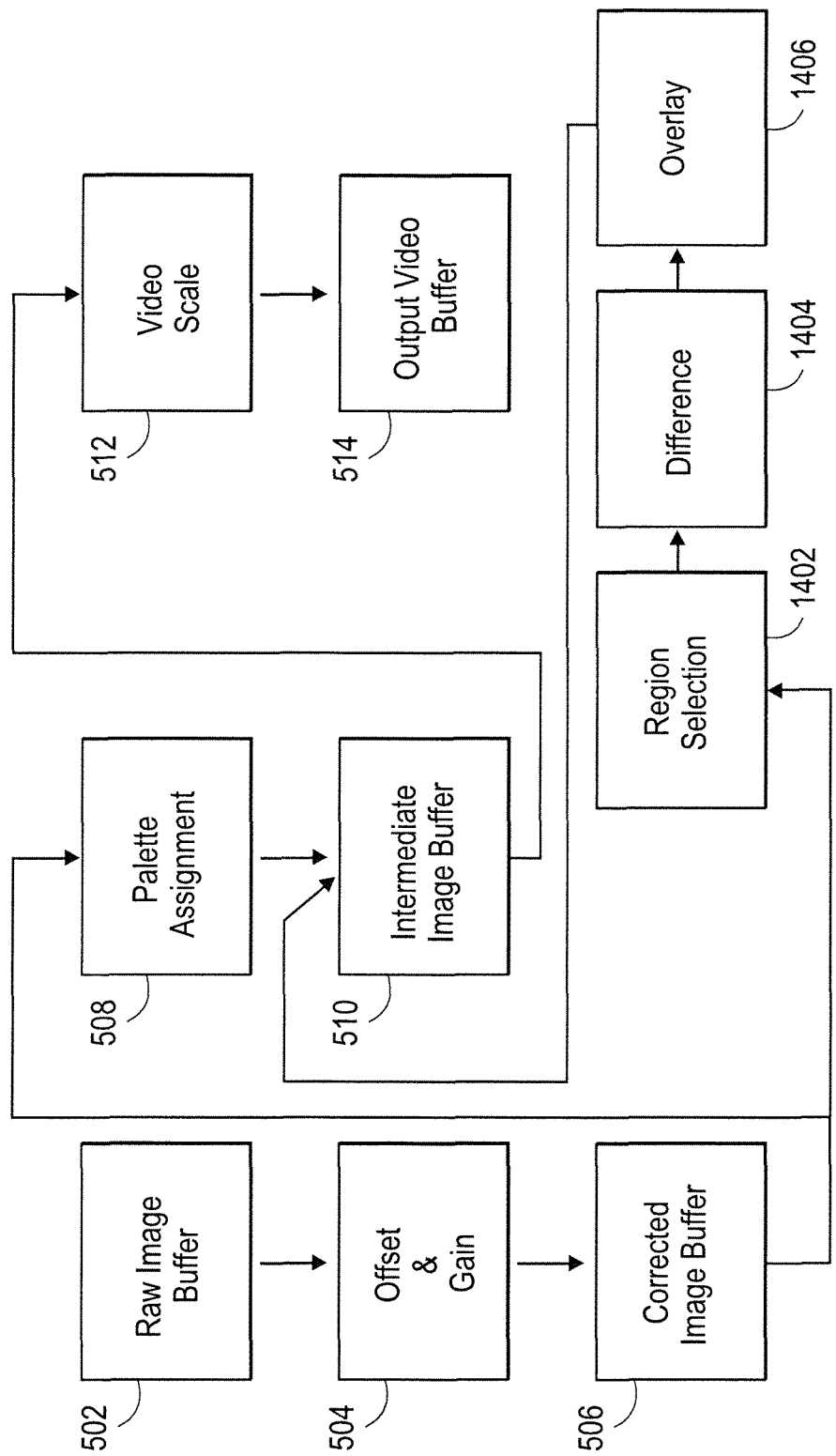
FIG. 14 is a flowchart of a method for implementing the method of FIG. 13.

Steps for implementing the above-stated temperature rate of change method are illustrated in FIG. 14 and include Step 1402 in which two or more regions are selected from a thermal image scene that was stored in the memory element, via Step 506; in Step 1404, a temperature rate of change determination is made between the regions; and in Step 1406, the temperature rate of change is further manipulated to generate a visual representation, which may then be overlaid onto the visual representation of the thermal scene stored in the memory element via Step 510. The steps illustrated by FIG. 14 may be implemented by the processing element, the memory element, or a combination of elements that are controlled or directed by the computer program of embodiments of the present invention.

By way of Step 1402, two or more regions may be selected from the corrected data saved in the memory element, via Step 506. In certain embodiments of the present invention, the user of the invention may select, via Step 412, regions. In further embodiments, the processing element, via Step 408 may instead select the regions. In such an embodiment, the regions may be selected based upon the regions of having high temperature values, or the regions may correlate to groups of sensing elements with indications of unique patterns or temperature profiles. After the regions have been selected, embodiments of the present invention determine, via step 1404, temperature values for the regions. In certain embodiments, the process element may determine an average temperature vale for all of the sensing elements, or group of sensing elements, that correspond to a region. Such averaging is advantageous because it may average out any erroneous or incorrect temperature measurements that may be inherent in the sensor.

Upon a determination of temperature values for the two or more regions, Step 1404 is responsible for determining the differences between temperature values for the regions. Via Step 1404, the processing element determines the difference between the average temperature values of the two or more regions. Such a determination results in both a magnitude of the temperature difference and a direction that exists between the two regions. As a result, the temperature difference determination for two given regions within a scene may be referred to as a thermal vector. Once the rate of change determination has been made, the rate of change values corresponding to each region are stored in the memory element.

Upon determining the rate of change values, Step 1406 is responsible for associating representative graphics with each rate of change value and applying the graphics as an overlay to the thermal image data that is saved in the memory element, at the Step 510. The representation for the rate of change values may include graphics in an arrow shape, thus representing a vector. The direction of in which an arrow is positioned and overlaid onto the thermal image may be in the existing direction that spatially separates the two or more regions. In addition, the magnitude of the temperature rate of change may be displayed via the arrow, as either a particular color, length, or size of the arrow. As an example, positive temperature rates of change (i.e. those associated with heating) may be represented by the color red with smaller magnitude rates of change may be identified using shades of pink. Conversely, negative temperature rates of change (i.e. those associated with cooling) may be represented by the color blue with smaller magnitude rates of change identified using shades of light blue. In such embodiments, the color of the arrow is representative of the magnitude of the temperature rate of change. In additional embodiments, the size or length of the arrow may be indicative of the magnitude of temperature rate of change. In such an embodiment, a smaller or shorter arrow would be indicative of a relatively small temperature rate of change, whereas a larger or longer arrow may be indicative of a relatively large temperature rate of change. In certain embodiments the graphics may be overlaid onto the thermal image data from Step 510. For example, the arrows may be displayed simultaneously with the display of the thermal scene, such as being displayed simultaneously with visual representation 602. Scenes without any change may remain the original grayscale colors assigned by Step 508. In other embodiments, the graphics representing the temperature rate of change may be used exclusively as the visual representation of the scene. In additional embodiments, a numerical figure may be presented on the display to represent the magnitude of the temperature rate of change.

Detection and Tracking

Embodiments of the present invention further provide for the detection and tracking of objects within the camera's field of view. In such an embodiment the camera works in conjunction with two or more servo-motors that operate to rotate the camera in both pan and tilt directions, such that the camera may rotate to cover all directions. The camera may work with any type of general, off-the-shelf servo-motor, but in certain embodiments two HS-985MG SERVO servo-motors may be used. Such servo-motors are capable of handling payloads of up to two pounds. The servo-motors are controlled by independent servo-motor drivers, such as the Polulu Servo Driver. The servo-motor driver provides the interface between the camera and the motors. The camera instructs the driver on how to control the servo-motors, such that the camera is continually directed at areas of interest that are to be tracked.

Figure 15:
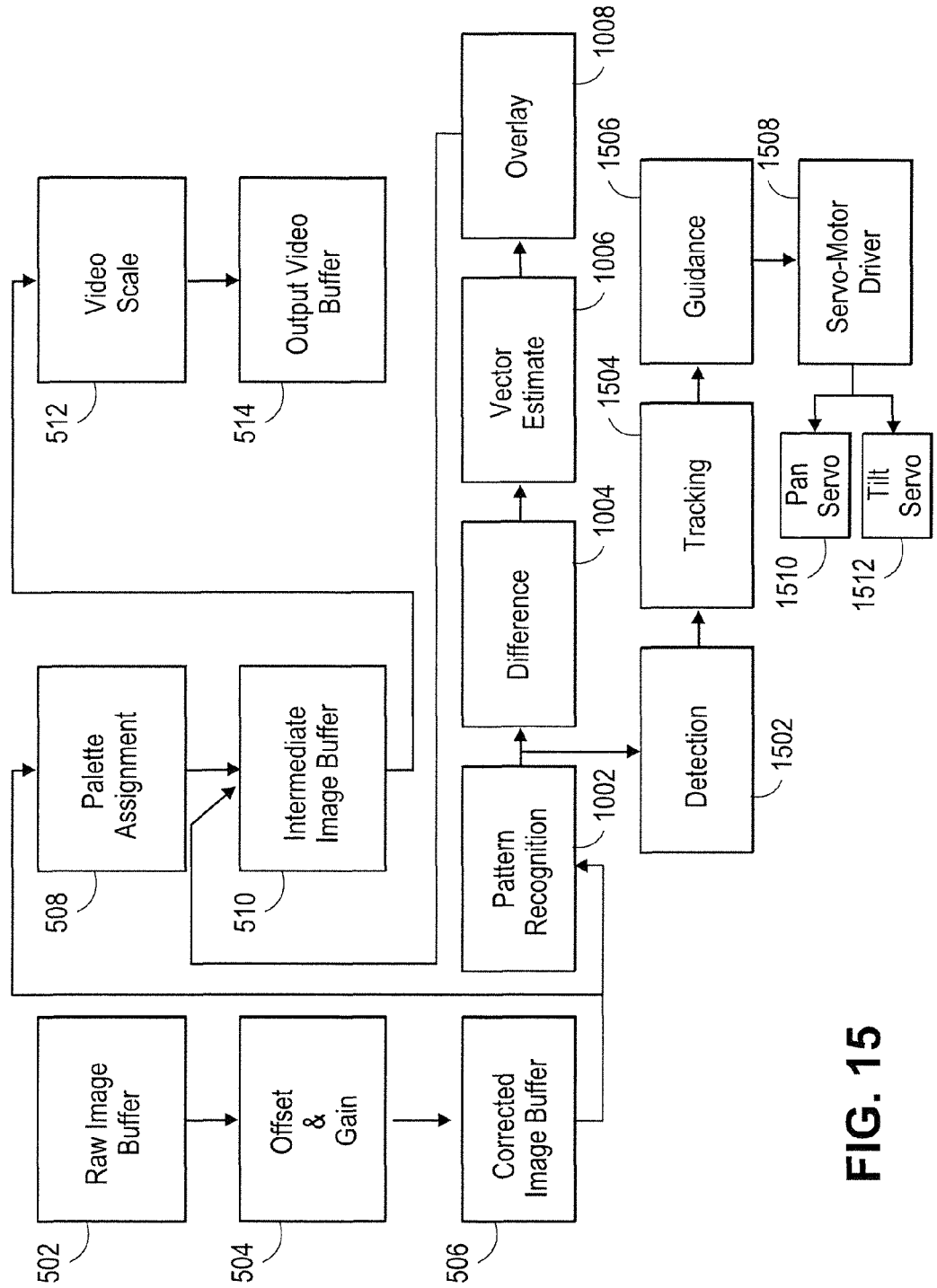
FIG. 15 is a flowchart for a method for detecting and tracking areas of interest.

An embodiment of the detection and tracking method is illustrated in FIG. 15 and broadly includes Step 1502 that analyzes and detects areas of interest; a Step 1504 estimates the current and future locations of the detected areas of interest; and a Step 1506 that communicates with the driver and servo-motors to guide the camera. In Step 1502, areas of interest detected in Step 1002 are analyzed. Areas of interest that exceed specified temperatures, or other consideration thresholds, are considered targets and are saved in the memory for further processing. The position, pattern, and temperature readings of the targets are all saved for processing. After all targets have been detected in a given scenes, Step 1502 analyzes all targets and selects the most significant target that is likely to pose the largest threat. The threat level of a target may be dependent on factors such as temperature level or the size of the target. The target that is determined to be the largest threat is passed on for tracking, via Step 1504.

By way of Step 1504, the targets are tracked in either a linear or non-linear tracking mode. The linear tracking mode functions by determining the displacement between the sensor's center sensing element and the position of the target for every frame cycle. Step 1504 provides instructions to be performed via the Step 1506, which directs the servo-motors to rotate the camera to a position where the target is positioned at the camera's center sensing element. Because the Step 1504 determines the displacement between the center sensing element and the target for every frame cycle, the servo-motors update the position of the camera at essentially the same rate as the frame cycle.

In the non-linear tracking mode, Step 1504 is responsible for tracking the motion of the target and estimating where in the camera's field of view the target is likely to be in the future. In such an embodiment, the Step 1504 obtains the temperature rates of change data from the temperature rate of change method described above. In Step 1504, the temperature values for the sensing elements are monitored in sequential scenes. Positive rates of change represent a target's current position, and negative rates of change represent the target's previous position. To determine a displacement, the absolute maximum values for the positive and negative rates of change for a selected target is determined. Because this maximum value coincides to the region of the target that carries the most thermal energy, it is generally immune to aspects of the target that may trigger false rate of change values or other errors. The displacement between maximum positive and negative values is compared to displacements measured in previous frame cycles to determine the target velocity and acceleration. The velocity of the target is measured in sensing elements per second, whereas the acceleration is measured in sensing elements per second squared. Step 1504 may then estimate what the expected position will be based on the current velocity and predicted acceleration. Instructions are then provided to and are carried out via the Step 1506, which direct the servo-motors to rotate the camera to a position where the target is positioned in the center of camera's field of view. In some instances, there may be tracking errors that are generated due to servo-motor position errors and servo-motor step sizes that are not in line with the predicted displacement of the target. Such errors are manifested as rounding errors. To combat such rounding errors, embodiments of the present invention provide for Step 1504 to sub-sample the sensing elements that are immediately outside the sensing elements that are included in the target. Such sub-sampling serves to trim out any errors. In such an embodiment, the estimation protocols from Step 1504 permit the camera to command the servo motors to guide the camera quicker and more efficiently than in the linear mode.

Once the target is being tracked via the Step 1504, commands are sent, via Step 1506 to the servo-motor's driver 1108 to instruct the motors 1510 and 1512 on how to position the camera such that the target is located in the center of the camera's field of view.

Although the invention has been described with reference to the embodiments illustrated in the attached drawing figures, it is noted that equivalents may be employed and substitutions made herein without departing from the scope of the invention as recited in the claims. For example, other alternative embodiments may combine various inventive features described above. As a non-limiting example, variations on methods for displaying temperature rates of change may be used. In addition, the detection and tracking method may additionally integrate and combine various aspects of the temperature rate of change methods, such that the present invention includes determining and displaying temperature rates of change along with tracking targets.

Having thus described various embodiments of the invention, what is claimed as new and desired to be protected by Letters Patent includes the following:

1. One or more non-transitory computer-readable media storing computer executable instructions that, when executed by a processor, is operable to measure temperature rates of change of a first region within a field of view of a thermal imaging camera according to the following:
   detect, via at least one infrared radiation sensor associated with the thermal imaging camera, an intensity of thermal radiation incident upon said sensor during one or more thermal scenes;
   store, in a memory element associated with the thermal imaging camera, data comprising the intensity level of thermal radiation incident upon the sensor during the one or more thermal scenes;
   automatically manipulate the data to determine continuously updated temperature rates of change of said first region within the camera's field of view and generate continuously updated video representations of the temperature rates of change of said first region,
   wherein the rates of change are determined by comparing the data detected by the sensor between at least two of the one or more thermal scenes;
   present, in real time and on a display associated with the thermal imaging camera, the continuously updated video representations of the temperature rates of change of said first region; and
   present, on the display, a magnitude of the temperature rate of change as a graphic color display, with negative temperature rates of change displayed in shades of a first color and positive temperature rates of change displayed in shades of a second color.

2. The computer-readable media of claim 1, wherein the first region corresponds to a single object present in the field of view.

3. The computer-readable media of claim 2, further operable to track motion of the object within the field of view.

4. The computer-readable media of claim 1, further operable to perform one or more of the following: temperature drift correction, pattern recognition, spatial noise filtering, and temporal noise filtering.

5. The computer-readable media of claim 1, further operable to present, on the display, at least one of the following: minimum, maximum, and average temperatures of the first region.

6. The computer-readable media of claim 1, further operable to:
   automatically manipulate the data to determine continuously updated temperature rates of change of a second region within the camera's field of view and generate continuously updated video representations of the temperature rates of change of said second region; and
   present, in real time and on the display, the continuously updated video representations of the temperature rates of change of said second region.

7. The computer-readable media of claim 1, further operable to:
   determine a temperature rate of change and a direction of the temperature rate of change between the first region and a second region of the one or more thermal scenes; and present, on the display, a magnitude and the direction of the temperature rate of change between the first region and the second region.

8. The computer-readable media of claim 7, wherein presenting the direction of the temperature rate of change between the first region and the second region includes presenting an arrow from the first region to the second region, or from the second region to the first region.

9. The computer-readable media of claim 8, wherein the magnitude of the temperature rate of change between the first region and the second region corresponds to a size of the arrow, a larger size of the arrow indicating a larger rate of temperature rate of change between the first region and the second region than a smaller size of the arrow.

10. The computer-readable media of claim 8, wherein the magnitude of the temperature rate of change between the first region and the second region corresponds to a color of the arrow, a darker shade of the color indicating a larger temperature rate of change between the first region and the second region than a lighter shade of the color.

11. The computer-readable media of claim 7, further operable to receive a selection, from a user, of the first region and the second region before determining the temperature rate of change between the first region and the second region.

12. The computer-readable media of claim 1, further operable to:
detect a pattern in a first thermal scene of the one or more thermal scenes;
store the detected pattern from the first thermal scene in the memory element;
detect one or more patterns in a subsequent thermal scene of the one or more thermal scenes; and
compare the detected one or more patterns from the subsequent thermal scene to the detected pattern from the first thermal scene.

13. The computer-readable media of claim 12, further operable to:
determine, based on the comparison, whether the detected pattern from the first thermal scene is present in the subsequent thermal scene; and
present, in real time and on the display, continuously updated video representations of temperature rates of change of the detected pattern from the first thermal scene in the subsequent thermal scene, if the detected pattern from the first thermal scene is present in the subsequent thermal scene.

14. The computer-readable media of claim 13, wherein the detected pattern from the first thermal scene is located in a first position in the first thermal scene, and in a second position different than the first position in the subsequent thermal scene, and the continuously updated video representations of temperature rates of change of the detected pattern from the first thermal scene are presented in the second position in the subsequent thermal scene.

15. The computer-readable media of claim 14, wherein the continuously updated video representations of temperature rates of change of the detected pattern from the first thermal scene presented in the second position in the subsequent thermal scene are based on differences in temperatures of the detected pattern from the first scene at the first position during the first scene, and the temperatures of the detected pattern from the first scene at the second position during the subsequent scene.

16. A computer-implemented method operable to measure temperature rates of change of a first region within a field of view of a thermal imaging camera according to the following:
detecting, via at least one infrared radiation sensor associated with the thermal imaging camera, an intensity of thermal radiation incident upon said sensor during one or more thermal scenes;
storing, in a memory element associated with the thermal imaging camera, data comprising the intensity level of thermal radiation incident upon the sensor during the one or more thermal scenes;
detecting, from the data, a pattern in a first thermal scene of the one or more thermal scenes;
storing the detected pattern from the first thermal scene in the memory element;
detecting one or more patterns in a subsequent thermal scene of the one or more thermal scenes;
comparing the detected one or more patterns from the subsequent thermal scene to the detected pattern from the first thermal scene;
determining, based on the comparison whether the detected pattern from the first thermal scene is present in the subsequent thermal scene; and
presenting, in real time and on a display associated with the thermal imaging camera, continuously updated video representations of temperature rates of change of the detected pattern from the first thermal scene in the subsequent thermal scene, if the detected pattern from the first thermal scene is present in the subsequent thermal scene, wherein:
the detected pattern from the first thermal scene is located in a first position in the first thermal scene, and in a second position different than the first position in the subsequent thermal scene;
the continuously updated video representations of temperature rates of change of the detected pattern from the first thermal scene are presented in the second position in the subsequent thermal scene; and
the continuously updated video representations of temperature rates of change of the detected pattern from the first thermal scene presented in the second position in the subsequent thermal scene are based on differences in temperatures of the detected pattern from the first scene at the first position during the first scene, and the temperatures of the detected pattern from the first scene at the second position during the subsequent scene.

17. A computer-implemented method operable to measure temperature rates of change of a first region within a field of view of a thermal imaging camera according to the following:
detecting, via at least one infrared radiation sensor associated with the thermal imaging camera, an intensity of thermal radiation incident upon said sensor during one or more thermal scenes;
storing, in a memory element associated with the thermal imaging camera, data comprising the intensity level of thermal radiation incident upon the sensor during the one or more thermal scenes;
receiving a selection, from a user, of the first region and a second region;
after the selection, automatically manipulating the data to determine continuously updated temperature rates of change between the first region and the second region; and presenting, in real time and on a display associated with the thermal imaging camera, a magnitude of the temperature rates of change between the first region and the second region, and a direction of the temperature rates of change between the first region and the second region, wherein presenting the direction of the temperature rates of change between the first region and the second region includes presenting an arrow from the first region to the second region, or from the second region to the first region.

\* \* \* \* \*